United States Patent [19]

Rozkuszka et al.

[11] Patent Number: 5,612,413
[45] Date of Patent: Mar. 18, 1997

[54] IMPACT-MODIFIED POLY(VINYL CHLORIDE)

[75] Inventors: Kenneth P. Rozkuszka, Melrose Park, Pa.; Jane E. Weier, Hopewell, N.J.

[73] Assignee: Rohm and Haas Company, Philadelphia, Pa.

[21] Appl. No.: 557,266

[22] Filed: Nov. 14, 1995

Related U.S. Application Data

[63] Continuation-in-part of Ser. No. 300,851, Sep. 8, 1994, abandoned.

[51] Int. Cl.$^6$ .................................................. C08L 51/04
[52] U.S. Cl. ............................. 525/85; 525/71; 525/78; 525/80; 525/902
[58] Field of Search ............................ 525/85, 78, 80, 525/71, 902

[56] References Cited

U.S. PATENT DOCUMENTS

| | | | |
|---|---|---|---|
| 3,251,904 | 5/1966 | Souder et al. | 525/85 |
| 3,678,133 | 7/1972 | Ryan | 525/82 |
| 3,808,180 | 4/1974 | Owens | 525/291 |
| 3,929,933 | 12/1975 | Gallagher | 525/223 |
| 3,969,431 | 7/1976 | Gallagher | 525/82 |
| 5,221,713 | 6/1993 | Kempner et al. | 525/71 |
| 5,237,004 | 8/1993 | Wu et al. | 525/85 |
| 5,312,575 | 5/1994 | Wills | 264/109 |
| 5,380,785 | 1/1995 | Ngoc et al. | 524/504 |

FOREIGN PATENT DOCUMENTS 1202155  2/1968  United Kingdom .

OTHER PUBLICATIONS

J59202246 Abstract (Derwent).
European Search Report of 14 Dec. 1995, EP 95 30 5761.

*Primary Examiner*—Mark L. Warzel
*Attorney, Agent, or Firm*—Roger K. Graham

[57] ABSTRACT

Poly(vinyl chloride), when impact modified with a core/shell impact modifier whose shell is predominantly formed from a $C_1$ to $C_4$ alkyl methacrylate and whose core is a copolymer of butyl acrylate and a specific compositional range of certain higher alkyl acrylate monomers, exhibits improved toughness, especially at lower use levels of the modifier or lower test temperatures for the blend, than when the core of the impact modifier is either substantially formed from butyl acrylate alone or substantially formed from the higher alkyl acrylate alone.

7 Claims, No Drawings

IMPACT-MODIFIED POLY(VINYL CHLORIDE)

This application is a continuation-in-part of U.S. application Ser. No. 08/300,851, filed Sep. 8, 1994 abandoned.

The present invention relates to a toughened weatherable blend of poly(vinyl chloride) with a specific acrylic copolymer rubber-based core/shell impact modifier, which blends exhibits unexpectedly good impact resistance.

Impact-modified poly(vinyl chloride) (PVC) for uses such as pipe, gutters, siding, window profiles and the like, has quite acceptable impact- and appearance-retention performance in outdoor applications where it is exposed to natural elements such as sunlight, rain, hail, sleet, or water sprays. Impact modifiers for weatherable PVC have been commercially available for over 20 years, and are commonly based on multi-stage (meth)acrylic polymers with a rubbery stage based on a rubbery poly(alkyl acrylate), usually poly(n-butyl acrylate).

A problem with such modifiers when blended with PVC has been a decrease in impact resistance of the blend at lower testing and use temperatures, such as below 0° C., and/or a need for high levels of relatively expensive impact modifier to attain acceptable impact resistance, but with some sacrifice in modulus, heat distortion temperature, or other desirable physical properties of the blend. Attempts have been made to alleviate this problem by use of rubbery stages based on higher alkyl acrylates, such as those containing from 8 to 12 carbon atoms, which polymers are known to have lower glass temperatures than poly(butyl acrylate). Such attempts have led to polymers of poorer impact performance in PVC blends than those based on poly(n-butyl acrylate).

Gallagher, U.S. Pat. No. 3,969,431, has shown that an emulsion copolymer of 50 to 70% butyl acrylate and 30 to 50% 2-ethylhexyl acrylate, when crosslinked with from 0.2 to 10% by weight of a polyfunctional crosslinker, is useful as a substrate for the suspension polymerization of poly(vinyl chloride) to a toughened product, teaching better impact than when less than 20% 2-ethylhexyl acrylate is employed in a similar composition. However, the '431 patent does not teach or suggest that higher levels of 2-ethylhexyl acrylate are less satisfactory, and does not teach or suggest application to a multi-stage emulsion polymer of much smaller particle size and with a $C_1$ to $C_4$ alkyl methacrylate final stage. Further, these modifiers require a separate polymerization of vinyl chloride, which requires pressure equipment and extensive safety controls.

Thus, a solution to the problem of achieving improved impact strength or more efficient utilization of a multi-stage (meth)acrylic impact modifier for PVC has not been previously specifically defined. We have now found that a narrow compositional range of copolymers of butyl acrylate with higher alkyl acrylates (as defined herein), preferably also containing a multi-functional monomer and preferably also of smaller particle size than normally taught in the art, are useful as first-stage rubbery copolymers which, when followed by a final stage polymerization of low levels of methyl methacrylate, yield a readily isolated powdery modifier which unexpectedly imparts superior impact resistance to weatherable formulations of PVC.

We have discovered a toughened blend comprising:
a. 100 parts of a polymer comprising at least 80 weight percent of units derived from vinyl chloride;
b. from 2 to 30 parts of a multi-stage impact modifier, wherein the first stage of the multi-stage impact modifier comprises from 75 to 95 weight percent of the total stages, preferably 85 to 92 weight percent of the total stages, and wherein the first stage is a copolymer, preferably of particle size diameter less than 400 nm, (as determined by photon correlation spectroscopy, a light scattering measurement on diluted emulsion), comprising
  1. from 60 to 80 weight percent of units derived from butyl acrylate,
  2. from 20 to 40 weight percent of units derived from an alkyl acrylate wherein the alkyl group contains from 8 to 12 carbon atoms,
  3. optionally, up to 5 weight percent of units derived from a monomer containing at least two non-conjugated copolymerizable carbon-carbon double bonds;
and wherein the final stage of the multi-stage impact modifier is a copolymer containing at least 50 weight percent, preferably at least 80% and more preferably substantially 100 weight percent, of units derived from a $C_1$ to $C_4$ alkyl methacrylate, preferably methyl methacrylate;

The toughened blend exhibits superior resistance to impact in comparison to control blends of identical composition and particle size, except that the first-stage of the multi-stage impact modifier of the control blend contains substantially 100 weight percent of units derived from butyl acrylate or contains substantially 100 weight percent of units derived from an alkyl acrylate wherein the alkyl group contains from 8 to 12 carbon atoms. By "substantially" is meant that there may be present a small amount (preferably less than about 2 weight percent, such as from 0.3 to 1.0 weight percent) of other monomers, such as multi-functional monomers.

In separate preferred embodiments, it is preferred that the polymer of vinyl chloride is a homopolymer of vinyl chloride, or that the alkyl acrylate containing from 8 to 12 carbon atoms in the alkyl group is 2-ethylhexyl acrylate, or that the monomer containing at least two non-conjugated copolymerizable carbon-carbon double bonds be present at from 0.5 to 1.0 weight percent. Another embodiment is that the final stage polymer further contains from 0.05 to 1.0 weight percent of units derived from a mercaptan chain transfer agent, such as an alkyl mercaptan, a mercaptoester, and the like.

It is further preferred that the monomer containing at least two non-conjugated copolymerizable carbon-carbon double bonds contains at least two carbon-carbon double bonds of the following acrylic or allylic structure

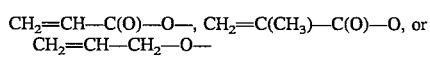

$CH_2{=}CH{-}C(O){-}O{-}$, $CH_2{=}C(CH_3){-}C(O){-}O$, or $CH_2{=}CH{-}CH_2{-}O{-}$

Examples of such monomers are 1,3-butylene glycol diacrylate, 1,4-butylene glycol diacrylate, trimethylolpropane triacrylate, allyl acrylate, allyl methacrylate, and the like. Other polyfunctional monomers may also be employed, such as divinylbenzene, 1,3-butylene glycol dimethacrylate, and the like.

For reasons of aiding isolation by coagulation or spray-drying by having present a shell of high glass temperature as well as conferring compatibility of the outer shell with the PVC matrix, it is preferred that the final stage of the multi-stage impact modifier is a homopolymer of methyl methacrylate, which may also contain a polyfunctional monomer, the polyfunctional monomer preferably present at levels of 0.3 to 1.0 weight % of all monomers in the stage polymerization, as defined above.

In another preferred embodiment, the particle size of the first stage is less than 150 nm, and the first stage copolymer comprises 85–88 weight percent of the total stages. Such modifiers can be isolated by coagulation from their emulsion preparation to yield free-flowing powders of outstanding impact efficiency.

The additive polymers are also useful as impact modifiers for engineering resins, such as aromatic polyesters, polycarbonate, and the like. For such uses, they may contain thermal stabilizers, such as hindered phenols, organic sulfur compounds, organic phosphites, and the like, which may be added to the polymer as it is being isolated from emulsion.

The additive polymers of the present invention are most useful for modification of poly(vinyl chloride) homo- and copolymers, such as those copolymers containing 80% or more vinyl chloride. Co-monomers may be vinyl acetate, ethyl acrylate, ethylene, and the like. When blended with poly(vinyl chloride) (PVC), the blend will also contain one or more thermal stabilizers for PVC, such as organotin compounds, organolead compounds, barium-cadmium organic salts, calcium-zinc organic salts, and the like. It may also contain lubricants to aid release from hot metal surfaces, such as waxes, olefin polymers, certain acrylic core/shell polymers, and also processing aids for promoting fusion, such as high molecular weight copolymers of methyl methacrylate. It may also contain colorants, fillers, and the like.

The blends are useful in opaque applications where toughness, especially at low temperature, and weatherability is desired. The uses include, but are not limited to, vinyl siding for houses, vinyl profiles for building products, and vinyl foam for building decoration, pipe, and the like. Production of useful objects is accomplished by techniques well-known to the vinyl industry. The blends may be made directly from powder blends, or may be first compounded into pellets for molding or extrusion. Conventional extrusion equipment for the profile of vinyl siding or profile may be utilized; if a foaming agent is also employed, good quality foam may be formed from appropriate foam extrusion apparatus for vinyl.

The blends of the present invention may also be useful as starting materials for the preparation of injection-molded articles, as the blends will exhibit good weatherability and good thermal aging properties.

The following are examples of the preparation and use of the modifiers of the present invention.

EXAMPLES

Examples 1–10

These examples demonstrate the unexpected advantages of the butyl acrylate/2-ethylhexyl acrylate copolymer composition of the first-stage elastomer in a modifier of particle size from 250–300 nm. and 20 weight-percent poly(methyl methacrylate) shell content.

This preparation is Example 2 in the following Tables. A multi-stage polymer is prepared in emulsion by the following recipe. (TMPTA is trimethylolpropane triacrylate, and BDA is 1,3-butylene glycol diacrylate). To an appropriate stirred reactor fitted with means for nitrogen sweep, a reflux condenser, and means for adding monomers and initiators, is charged 1586 grams of deionized water and 0.4 ml. of glacial acetic acid which is heated to 45° C. while sparging with nitrogen for one hour. The nitrogen is now adjusted to sweep the atmosphere over the reaction mixture and 1.6 grams of sodium formaldehyde sulfoxylate (SSF) (0.1% BOM (based on monomer)) in 48 grams of water is added and stirred for 3 minutes. A gradual addition of an initiator feed over a 15-minute period is begun; the feed is 0.24 ml. of cumene hydroperoxide (CHP) emulsified in 54 grams of water with 1.1 grams of a 28% solution of sodium lauryl sulfate. Simultaneously or almost simultaneously there is added over 15 minutes 210 grams of an emulsified monomer mix (EMM) comprising 30.7 grams of a 28% sodium lauryl sulfate solution, 460 grams of water, 1107.6 grams of butyl acrylate (BA), 478.4 grams of 2-ethylhexyl acrylate (2-EHA), 19.3 grams of BDA, and 60 grams of a water rinse.

After a three minute hold, the reaction, now at ca. 52° C., is treated with 0.48 grams CHP and 420 grams of the EMM over a 12 minute period, then 0.96 grams CHP and 838 grams of the EMM over a 11 minute period, then 0.48 grams CHP and 420 grams of the EMM over a 4 minute period, then 0.24 grams CHP and 210 grams of the EMM over a 5 minute period. At this point, the reaction temperature is ca. 92° C. The reaction mixture is held for one hour, then chased with 0.32 g. SSF in 10 grams of water and 0.36 grams of CHP. After 30 minutes further, the conversion, based on expected solids, is 97.8%. The reaction mixture is cooled. The conversion is 99.3%, based on final solids, and the particle size 281 nm.

This cross-linked rubbery latex "core" or first-stage (970 g.) is charged to a similar reactor and heated to 48° C. while sparging lightly with nitrogen for 45 minutes. The nitrogen is adjusted to a sweep, and a emulsified monomer mix of 4.0 grams of 28% sodium lauryl sulfate solution, 102 grams of methyl methacrylate, and 0.004 ml. (0.004% BOM) t-dodecyl mercaptan is added all at once and stirred for 5 minutes. Then is added SSF (0.09 grams) in 30 ml. water with a 10 ml., rinse, stirring is continued for 34 minutes, and then sodium persulfate (NAPS) (0.09 grams) in 30 ml. water with a 10 ml., rinse is added. After 25 minutes, the temperature has peaked, and the mixture is heated to 60° C. and held there for one hour. A chase of 0.02 grams SSF in 5 ml. water and 0.02 grams NaPS in 5 ml. water are added and the reaction held at 60° C. for one more hour. The polymeric emulsion is then filtered and cooled. The particle size is 274 nanometers (although experimentally smaller than the starting rubber latex, the values are within experimental error and approximately equal, as would be expected from the small amount of methyl methacrylate layered onto the large amount of acrylic polymer core).

The polymer is isolated from the emulsion by spray-drying at 140° C. inlet and 60° C. outlet.

In a similar manner are prepared impact modifiers having varying compositions of rubber core: Example 2 is a 70/30 ratio, Example 3 is a 50/50 ratio, Example 4 a 30/70 ratio, and Example 5 a 2-EHA homopolymer (except for the butylene glycol diacrylate). Example 1 (BA homopolymer) is prepared in a similar manner except that a small amount of an butyl acrylate seed is present in the first stage to set particle size, and that TMPTA at 1.1% concentration is employed instead of BDA.

In a similar manner may be prepared core/shell polymers where the SLS is replaced as the emulsifier by an alkaryl sulfonate or a diphenyl ether sulfonate.

The impact modifier samples are summarized in Table I. The glass temperature ($T_g$) of the rubbery first stage is calculated from the Fox equation, ignoring the small amount of cross-linking monomer, where $w_1$ is the weight percent of butyl acrylate, $w_2$ is the weight percent of 2-ethylhexyl acrylate, $T_{g1}$ is −55° C., and $T_{g2}$ is −85° C. In all cases, the first-stage is 80% of the total two-stage modifier, the second stage being methyl methacrylate homopolymer.

$$1/T_g = w_1/T_{g1} + w_2/T_{g2}$$

| Modifier | BA/2-EHA, weight ratio | $T_g$ | Cross-linker, weight percent | Particle size, nm |
|---|---|---|---|---|
| Ex. 1 | 100/0 | −55 | TMPTA, 1.1 | 252 |
| Ex. 2 | 70/30 | −64 | BDA, 1.2 | 274 |
| Ex. 3 | 50/50 | −70 | BDA, 1.2 | 304 |
| Ex. 4 | 30/70 | −76 | BDA, 1.2 | 290 |
| Ex. 5 | 0/100 | −85 | BDA, 1.2 | 295 |

The modifiers are evaluated in a twin-screw siding formulation by milling and compression-molding samples for notched Izod impact testing. The formulation contains 100 parts of K-65 PVC (homopolymer of medium molecular weight used in commercial siding formulations), 1.6 parts of dimethyltin 2-ethylhexylthioglycolate stabilizer, 1.3 parts of calcium stearate, 1.0 parts of a wax, 10 parts of titanium dioxide, 0.5 parts of a high molecular weight (about 1,000,000 daltons) methyl methacrylate/ethyl acrylate 90/10 processing aid, 1 part of a butyl acrylate/styrene/methyl methacrylate lubricating-processing aid, and X parts of the impact modifier, where X is 6, 7, or 8.

Notched Izod testing is employed, and the number of ductile breaks out of 10 bars measure at the indicated test temperature is measured, rather than averaging the values between brittle and ductile breaks.

| Test Temp., phr | Ex. 1 | Ex. 2 | Ex. 3 | Ex. 4 | Ex. 5 |
|---|---|---|---|---|---|
| 23° C., 6 phr | 8 | 10 | 3 | 3 | 0 |
| 23° C., 7 phr | 10 | 10 | 6 | 4 | 0 |
| 23° C., 8 phr | 10 | 10 | 9 | 10 | 0 |
| 19° C., 6 phr | 4 | 10 | 0 | 1 | 0 |
| 19° C., 7 phr | 7 | 10 | 2 | 4 | 0 |
| 19° C., 8 phr | 10 | 10 | 5 | 4 | 0 |
| 15° C., 6 phr | 0 | 1 | 0 | 0 | 0 |
| 15° C., 7 phr | 0 | 5 | 0 | 0 | 0 |
| 15° C., 8 phr | 5 | 10 | 0 | 1 | 0 |
| Overall % ductile | 60 | 84 | 28 | 30 | 0 |

Example 11

This examples illustrates a method for preparing a similar core/shell polymer based on a BA/2-EHA copolymer rubber, but with a smaller particle size and with 12% outer stage or shell. To a 20-liter stirred reactor fitted with means for nitrogen sweep, a reflux condenser, and means for adding monomers and initiators, is added 5888.7 grams water, which is heated to 55° C. with a nitrogen sparge. The sparge is adjusted to a sweep, and then is added 87.4 grams of a 0.125% solution of p-nitrosophenol with a 37.3 gram water rinse, followed by 75.9 grams of a 1.44% tartaric acid solution and 17.3 grams of a water rinse, followed by 7.8 grams of a 28% solution of sodium lauryl sulfate, 86.6 grams water, and a 25.1 gram water rinse.

Shot feed of initiator, activator, and emulsified monomer mix (EMM) is now begun. The initiator is t-butylhydroperoxide, the activator is sodium formaldehyde sulfoxylate (5.7 grams in 86.6 grams water plus a 25.1 gram water rinse), and the EMM is 3799 grams of butyl acrylate, 1628 grams 2-ethylhexyl acrylate, 38.3 grams ALMA (0.7% based on total first-stage monomers), 3.4 grams sodium lauryl sulfate (added as a 28% solution) and 1400 grams water. The EMM is added prior to the initiator.

| Shot # | EMM | t-BHP | Time to add |
|---|---|---|---|
| 1 | 767.2 | 0.98 | Start; add activator solution after initiator. Add 153.42 grams sodium lauryl sulfate, 71.8 grams water, and 142.4 grams water rinse remainder of EMM. |
| 2 | 649.8 | 0.76 | Exotherm peak plus 15 minutes, cool to 53 °C., add shot #2 |
| 3 | 2924.5 | 3.47 | Exotherm peak plus 15 minutes, cool to 53 °C., add shot #3 |
| 4 | 2088 | 3.1 | Exotherm peak plus 15 minutes, cool to 57 °C., add shot #4 (with 91 grams water rinse for EMM). |

After the exotherm after addition of shot #4, the reaction is maintained for 3 minutes. The 0.91 grams of t-butylhydroperoxide, 0.6 grams of sodium formaldehyde sulfoxylate and 37.2 grams of water are added and the reaction is maintained for one hour before adjusting the temperature to 53° C.

This cross-linked rubbery latex "core" or first-stage (13817 g., 43% solids) is maintained in the reactor. A pre-emulsified mix of methyl methacrylate 745.3 grams, 26.6 grams of sodium lauryl sulfate and 941 grams of rinse water is prepared. This EMM is added to the reactor kettle and stirred for 10 minutes, then sodium formaldehyde sulfoxylate (1.13 grams) in 37.25 grams water and 37.25 grams rinse is added and stirred for 3 minutes, followed by sodium persulfate (1.13 grams) in 37.25 grams water, plus 37.25 grams water rinse, is added. The reaction is allowed to exotherm; at the exotherm temperature is added 0.38 grams sodium formaldehyde sulfoxylate in 12.2 grams water and 12.2 grams water rinse, followed immediately by 0.38 grams sodium persulfate in 12.2 grams water and 12.2 grams water rinse. The reaction is held for one hour, cooled, and filtered of gel, if desired. The final particle size is 140 nanometers.

Examples 12–18

A number of samples are prepared by a similar process but in a 5-liter reactor. In this series, the amount of sodium lauryl sulfate present at the beginning is 0.05% for most runs, being slightly adjusted at higher EHA content to achieve a consistency of particle size of 140 nm throughout the series. Further, the level of allyl methacrylate is 0.7% based on the weight of butyl acrylate plus allyl methacrylate in the rubber core stage, and there is present 0.3% of n-dodecyl mercaptan added with the emulsified monomer mix for the second stage.

Example 19

This example illustrates the isolation and testing procedures. The polymer, such as from Examples 11–18, is isolated from the emulsion by the following process:

A 0.575% aqueous solution of calcium chloride is prepared (1200 grams), which is heated to 40° C. Provision for rapid stirring is made. Separately, the emulsion is diluted to 30% solids with de-ionized water, and 600 grams is separately heated to 40° C. The heated emulsion is then added over a 60 second period to the rapidly agitated $CaCl_2$ solution. The mixture is then heated to 80° C. and held there for 15 minutes. The mixture is then cooled, the coagulated polymer is removed by filtration, and the polymer washed further with water. The polymer is dried for 2 hours at 80° C. in a fluid bed drier for approximately 2 hours, prior to any evaluation in PVC.

The polymers from examples 11–18 are evaluated in PVC in the following manner in a twin-screw siding formulation, which name refers to the formulation as being suitable for extrusion in a twin-screw extruder into sheet and profile for outdoor siding. A high molecular weight (Fikentscher K=67) PVC homopolymer is employed. All weights of materials are in PHR (parts per hundred parts of PVC resin). Compression-molding samples for notched Izod impact testing are prepared as described below. The organotin stabilizer (OTS) is mainly dimethyltin bis(2-ethylhexylthioglycolate). The wax is believed to be a polyethylene wax. The acrylic processing aid (APA) is a high molecular weight (above 1,000,000) 90/10 MMA/EA copolymer used widely as a processing aid for PVC. The lubricating process aid (LPA) for PVC is a core/shell polymer of a low MW (<400,000) butyl acrylate/styrene core and a shell of approximately equivalent weight of a higher MW (>500,000) MMA polymer.

The blend is prepared by admixing the ingredients in the order specified, heating to 110° C. in a suitable tumbled or stirred apparatus, and then cooling at low speed. Since the addition of the impact modifier comes near the end of the cycle, it is also suitable to prepare a masterbatch without impact modifier, and then make various blends containing different amounts of the same impact modifier, or different impact modifiers at the same amount. The total amount of powder used for each milling experiment is ca. 240 grams.

TSSF MASTERBATCH

| Component | phr | Addition Temp., °C. | Order of Addition |
|---|---|---|---|
| PVC, K = 67 | 100 | 23 | 1 |
| OTS | 1.6 | 55 | 2 |
| Calcium Stearate | 1.3 | 65 | 3 |
| Wax | 1 | 65 | 4 |
| APA | 0.5 | 82 | 5 |
| LPA | 1 | 82 | 6 |
| Impact Modifier | VARIABLE | 82 | 7 |
| TiO$_2$ | 10 | 93 | 8 |

The blends are individually milled on a heated two-roll mill, rolls approximately 15 cm. in diameter and 33 cm. in width. The width of the nip is ca. 0.3 mm. at the start and is opened over the course of 4 minutes to ca. 0.64 mm. The front roll is turned at 26 rpm and the back at 20 rpm. The temperature is 180° C. The blend takes ca. 1 minute to flux, and 3 minutes for cutting and re-milling.

The hot PVC is cut from the mill, folded and pressed in such a way that the shear or milling direction remains constant in all layers. After folding, the sheet is placed in a metal mold, 3 mm by 165 mm by 254 mm and pressed in a heated Carver press or the equivalent according to the following schedule:

Carver Pressing Conditions

| Time, minutes | pressure, kg. | Temp., °C. |
|---|---|---|
| 3 | 9090 | 180 |
| 2 | 63640 | 180 |
| 5 | 63640 | cool from 180 with cold water in platens |

From the milled stock, Izod impact bars (3 mm. by 13 mm. by 63.5 mm, notch radius 0.25 mm) are cut in the machine direction (direction that the sheet was milled, not perpendicular to the milling direction). Samples are tested at various temperatures by ASTM D-256. Both total energy absorbed and the nature of the break (hinged or ductile vs. clean) are recorded.

IZOD TEST CONDITIONS

| Label | Temp., °C. | phr additive |
|---|---|---|
| A | 13 | 6 |
| B | 11 | 7 |
| C | 13 | 7 |
| D | −5 | 16 |
| E | −10 | 16 |
| F | 15 | 6 |
| G | 15 | 7 |
| H | 19 | 6 |

TABLE III

| Example # | % EHA IN CORE | SLS in first stage | IZOD A, % ductile | IZOD B, % ductile | IZOD C, % ductile | IZOD D, % ductile | IZOD E, % ductile (energy, kJ/m) |
|---|---|---|---|---|---|---|---|
| 11 | 30 | 0.05 | 75 | | 95 | | |
| 12 | 0 | 0.05 | 0 | 7 | 82 | | |
| 13 | 20 | 0.05 | 38 | 44 | 93 | 86 | 0 (4.9) |
| 14 | 30 | 0.05 | 19 | 38 | 86 | | |
| 15 | 40 | 0.05 | 7 | 75 | 93 | 100 | 0 (6.1) |
| 16 | 50 | 0.05 | 0 | 32 | 93 | | |
| 17 | 70 | 0.07 | 0 | 0 | 25 | | |
| 18 | 100 | 0.12 | | | | 14 | 0 (4.5) |

It can be seen that, although there is some inconsistency at different levels of modifier or test temperatures, that there is consistently better performance for the copolymers over the homopolymer of 2-EHA or the homopolymer of butyl acrylate. The advantages of the 20–40 weight level amount of 2-ethylhexyl acrylate in the acrylate core feed is evident. The good impact values and processability of the PVC blends are excellent predictors for good performance in commercial siding and profile applications.

Examples 20–22

By variants of the process for Examples 12–18, further variants in composition (BA/EHA ratio), core and shell ALMA, were prepared. Particle size was controlled by a grow-out process beginning with a smaller number of particles formed in the initiation step. n-Dodecyl mercaptan was present at the 0.4% stage, and was added to the monomers charged as neat material (non-emulsified). There was no multifunctional monomer in the second stage. Again, the advantages of the copolymeric core composition over the homopolymer of 2-ethylhexyl acrylate are demonstrated.

TABLE IV

| Example # | % EHA IN CORE | % ALMA in first stage | particle size, nm | IZOD F, % ductile (energy, J/m) | IZOD G, % ductile (energy, J/m) | IZOD H, % ductile (energy, J/m) |
| --- | --- | --- | --- | --- | --- | --- |
| 20 | 100 | 0.7 | 140 | 0 (3.9) | 100 (23.8) | 100 (26.9) |
| 21 | 40 | 0.7 | 140 | 85 (4.1) | 100 (26.9) | 100 (29.2) |
| 22 | 100 | 0.7 | 300 | 0 | 0 | 0 |
| 23 | 40 | 0.7 | 300 | 0 | 30 | 80 |
| 24 | 100 | 1.1 | 300 | 0 | 0 | 15 |
| 25 | 70 | 0.9 | 270 | 0 | 20 | 60 |

Examples 26–35

These examples further illustrate the trend of improved impact strength for these copolymeric materials with variations of the polymers made in a manner similar to Examples 20–25. Here again the percentage of ALMA in the first-stage (core) is varied, as is the particle size. In two cases, additives with 80% rubber content, rather than 88% are shown.

TABLE V

| Example # | % EHA IN CORE # = 80% core | % ALMA in first stage | particle size, nm | IZOD F, % ductile (energy, J/m) | IZOD G, % ductile (energy, J/m) | IZOD H, % ductile (energy, J/m) |
| --- | --- | --- | --- | --- | --- | --- |
| 26 | 40 | 0.3 | 140 | 45 | 65 | |
| 27 | 100 | 0.3 | 140 | 10 | 20 | |
| 28 | 40 | 1.1 | 90 | 100 | | 70 |
| 29 | 100 | 1.1 | 90 | 55 | 50 | |
| 30 | 40 | 0.3 | 90 | 0 | 20 | |
| 31 | 70 | 0.7 | 115 | 83 | 35 | |
| 32 (#) | 40 | 1.1 | 150 | 20 | 80 | |
| 33 (#) | 40 | 1.1 | 90 | 75 | | 45 |
| 34 | 40 | 1.1 | 140 | 100 | | 60 |
| 35 | 100 | 1.1 | 140 | 50 | 55 | |

We claim:
1. A toughened blend comprising:
 a. 100 parts of a polymer comprising at least 80 weight percent of units derived from vinyl chloride;
 b. from 2 to 30 parts of a multi-stage impact modifier, wherein the first stage of the multi-stage impact modifier comprises from 80 to 95 weight percent of the total stages, the first stage comprising
  1. from 60 to 80 weight percent of units derived from butyl acrylate,
  2. from 20 to 40 weight percent of units derived from 2-ethylhexyl acrylate,
  3. from 0.5 to 1.2 weight percent of units derived from a monomer containing at least two non-conjugated copolymerizable carbon-carbon double bonds of the structure

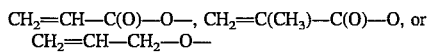

and wherein the final stage of the multi-stage impact modifier is a copolymer containing at least 80 weight percent of units derived from methyl methacrylate; wherein all stages of the multi-stage impact polymer are prepared by emulsion polymerization; and wherein the toughened blend exhibits superior resistance to impact in comparison to control blends of identical composition and particle size, except that the first-stage of the multi-stage impact modifier of the control blend contains substantially 100 weight percent of units derived from butyl acrylate or contains substantially 100 weight percent of units derived from 2-ethylhexyl acrylate.

2. The blend of claim 1 wherein the polymer of vinyl chloride is a homopolymer of vinyl chloride.

3. The blend of claim 1 wherein the final stage of the multi-stage impact modifier is substantially a homopolymer of methyl methacrylate.

4. The blend of claim 1 wherein the final stage of the multi-stage impact modifier is a polymer of methyl methacrylate with a co-monomer containing at least two non-conjugated copolymerizable carbon-carbon double bonds present at from 0.3 to 1.0 weight percent.

5. The blend of claim 1 wherein the particle size of the first stage (as determined by photon correlation spectroscopy), is less than 400 nm, and wherein the first stage copolymer comprises 85–92 weight percent of the total stages.

6. The blend of claim 1 wherein the final stage further contains from 0.05 to 1.0 weight percent of polymerized units of a mercaptan chain transfer agent.

7. The blend of claim 1 in the form of an extruded or injection-molded article.

* * * * *